No. 640,641. Patented Jan. 2, 1900.
E. ENGELMANN.
RUNNING GEAR FOR VEHICLES.
(Application filed Mar. 24, 1899.)
(No Model.) 2 Sheets—Sheet 1.

WITNESSES:
M. H. Wurtzel
G. C. Geibel

INVENTOR
Emil Engelmann
BY
Sachse & Raegener
ATTORNEYS.

No. 640,641. Patented Jan. 2, 1900.
E. ENGELMANN.
RUNNING GEAR FOR VEHICLES.
(Application filed Mar. 24, 1899.)
(No Model.) 2 Sheets—Sheet 2.
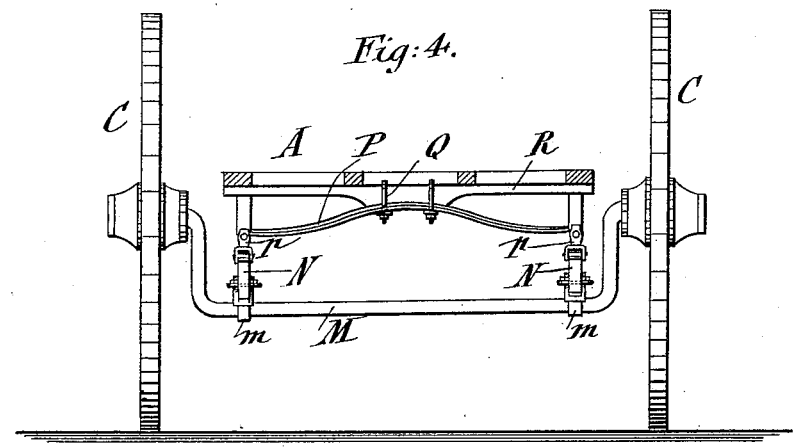
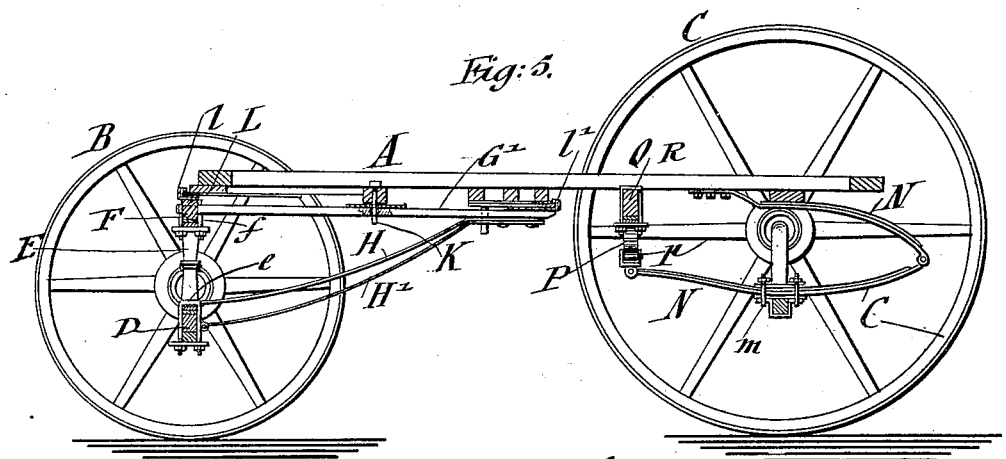
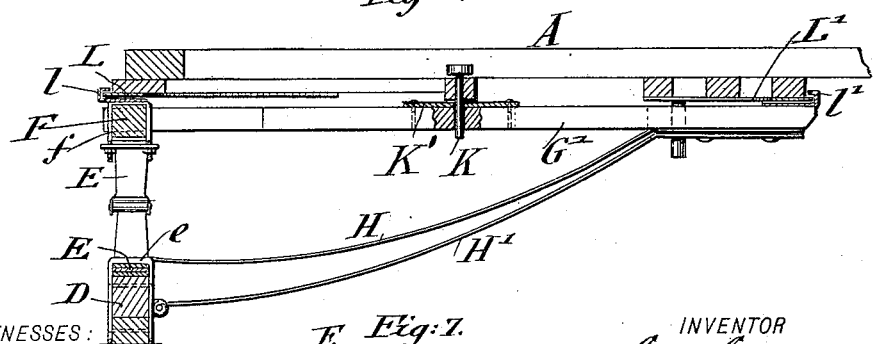
WITNESSES:
M. H. Wurtzel
G. C. Geibel
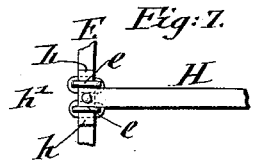
INVENTOR
Emil Engelmann
BY
ATTORNEYS.

United States Patent Office.

EMIL ENGELMANN, OF JERSEY CITY, NEW JERSEY.

RUNNING-GEAR FOR VEHICLES.

SPECIFICATION forming part of Letters Patent No. 640,641, dated January 2, 1900.

Application filed March 24, 1899. Serial No. 710,339. (No model.)

*To all whom it may concern:*

Be it known that I, EMIL ENGELMANN, a citizen of the United States, residing in Jersey City, in the county of Hudson and State of New Jersey, have invented certain new and useful Improvements in Running-Gear for Vehicles, of which the following is a specification.

This invention relates to running-gear for vehicles, such as delivery-wagons and the like; and the object of the same is to dispense with the coupling-pole or reach and to permit the turning of the vehicle in a less space than ordinary.
Heretofore in that class of vehicles in which the fore wheels are smaller than the hind wheels, so as to increase the draft, and in which the hind wheels are carried by a bent or cranked axle, a reach or perch was employed; but this is done away with in the present invention by making the bed or platform take the place thereof.

To these ends my invention consists of a running-gear for vehicles which comprises a wagon-bed, a cranked hind axle, C-springs supporting the bed from said axle, and a fore truck which is swiveled to the forward part of the bed by a king-bolt and is composed of a bolster, a fore axle, an elliptic spring connecting the latter and the bed, converging hounds connected with the said bolster, and a brace connecting the hounds and fore axle, and a fifth-wheel upon which the said truck has bearing and by which the wagon is prevented from careening, all as will be hereinafter fully described, and then particularly claimed.

Figure 1:
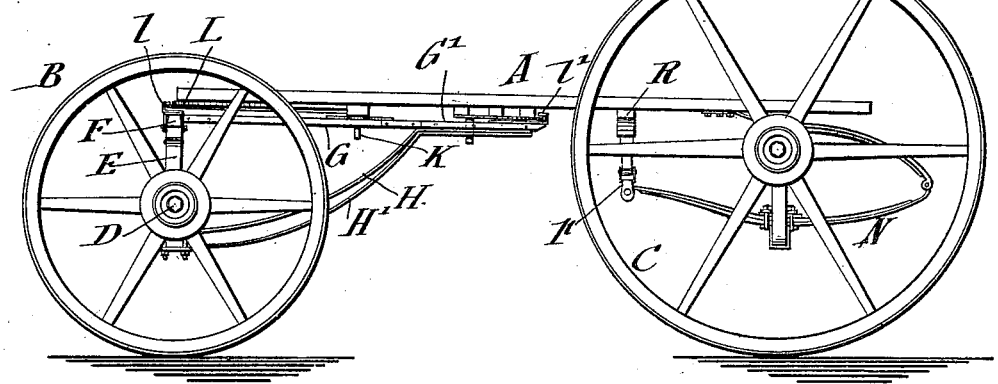
Figure 2:
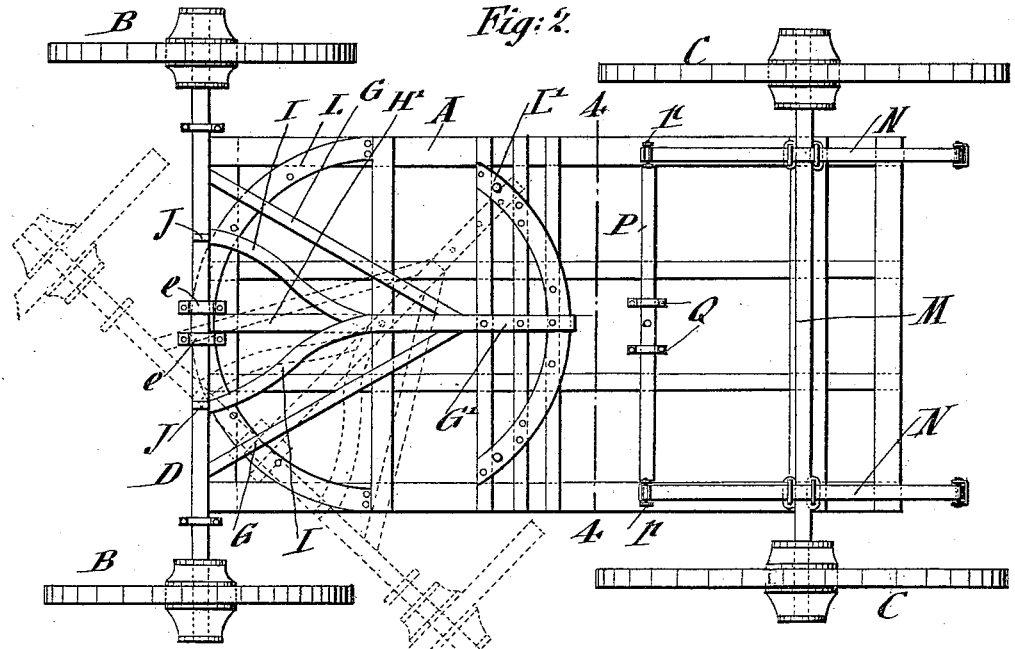
Figure 3:
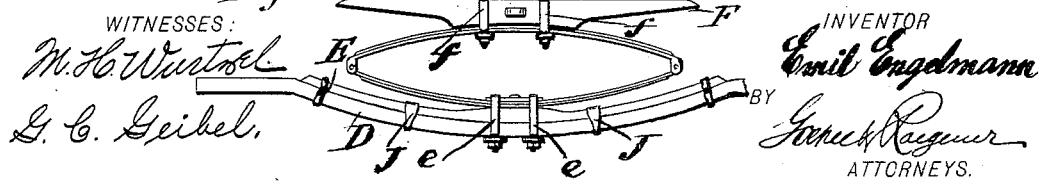

In the accompanying drawings, Figure 1 is a side elevation of my improved vehicle running-gear. Fig. 2 is an under side view of the same, showing the fore truck in dotted lines as turned. Fig. 3 is a front elevation with the wheels removed and part broken away. Fig. 4 is a section on line 4 4, Fig. 2. Fig. 5 is a vertical longitudinal section. Fig. 6 is an enlarged detail section of the front part of the wagon-bed and the fore truck, and Fig. 7 is a broken detail view of a part of the front truck.
Similar letters of reference indicate corresponding parts.

Referring to the drawings, A represents the bed of the wagon, which is composed of a suitable framework adapted to support the wagon-body. (Not shown.)

B represents the fore wheels, and C the hind wheels.

The fore wheels B are mounted on the ends of the axle D, which is curved downwardly toward the middle or cranked, as shown in Fig. 3. An elliptic spring E is secured to the fore axle by clips $e\ e$, and the upper part of the spring E is secured to a bolster F by clips $f\ f$. Converging rearwardly from the bolster F are the hounds G, which are arranged on each side of the center piece G', attached to the bolster and the rear ends of the hounds. Fastened to the rearwardly-projecting end of the center piece G' is a center brace H, curved downwardly and forwardly and provided at its forward end with laterally-extending ears or lugs $h$, so that by means of the rivet $h'$ and the clips $e\ e$, which pass over said ears $h$, (see Fig. 7,) the brace is firmly connected with the lower section of the elliptic spring. A second center brace H' is arranged under brace H. Additional converging braces I are secured at their converging rear ends to the center piece G' and at their spread-forward ends to the axle D by means of shackles J.

The parts described, with the exception of the wheels and bed, form a truck, which is swiveled to the bed A by means of a king-bolt K, which passes through the center piece G'. A wear-plate K' is arranged between the bed and the truck.

To avoid careening of the vehicle, fifth-wheel sectors L L', respectively front and rear, are attached to the bed A, upon the edges of which sectors guide-pieces $l\ l'$, attached to the front and rear ends of the truck, are guided.

The hind axle M is cranked, and to the same are secured, by clips $m$, the longer forwardly-extending lower sections of a pair of C-springs N N, the upper sections of which are secured to the bed A. The forward ends of the lower sections of the C-springs are hinge-jointed to the outer ends of a semi-elliptic spring P by means of shackles P. The spring P extends transversely across the bed of the vehicle and is secured, by means of clips Q, to a transverse bolster R of the bed.

In the running-gear constructed as described it will be observed that the prominent feature is the doing away with the reach or perch, as the bed of the vehicle itself takes the place of the reach. This construction possesses the further advantage that the entire body of the vehicle and the load can be brought near to the axles, so as to be loaded or unloaded with great facility.

Having thus described my invention, what I claim as new, and desire to secure by Letters Patent, is—

In a running-gear for vehicles, a front truck, consisting of a downwardly-bent fore axle, an elliptic spring to the lower section of which said fore axle is clipped, a bolster clipped to the upper section of said spring, a center piece and hounds extending rearwardly from the bolster and meeting at their rear ends, a center brace extending under and secured to the center piece and at its forward end being clipped to the lower section of said spring, and side braces extending from the fore axle and converging at the rear end of the center piece, substantially as set forth.

In testimony that I claim the foregoing as my invention I have signed my name in presence of two subscribing witnesses.

EMIL ENGELMANN.

Witnesses:
PAUL GOEPEL,
M. H. WURTZEL.